US010102362B2

United States Patent
Singh et al.

(10) Patent No.: US 10,102,362 B2
(45) Date of Patent: Oct. 16, 2018

(54) METHOD AND SYSTEM OF SILENT BIOMETRIC SECURITY PRIVACY PROTECTION FOR SMART DEVICES

(71) Applicant: Reliance Jio Infocomm Limited, Mumbai (IN)

(72) Inventors: Gulprit Singh, Bhopal (IN); Karan Sachan, Meerut (IN)

(73) Assignee: RELIANCE JIO INFOCOMM LIMITED, Mumbai (IN)

(*) Notice: Subject to any disclaimer, the term of this patent is extended or adjusted under 35 U.S.C. 154(b) by 190 days.

(21) Appl. No.: 14/998,129

(22) Filed: Dec. 24, 2015

(65) Prior Publication Data
US 2016/0188862 A1    Jun. 30, 2016

(30) Foreign Application Priority Data
Dec. 26, 2014 (IN) .......................... 4169/MUM/2014

(51) Int. Cl.
G06F 21/32 (2013.01)
G06F 21/62 (2013.01)
H04L 29/06 (2006.01)

(52) U.S. Cl.
CPC .......... *G06F 21/32* (2013.01); *G06F 21/6263* (2013.01); *H04L 63/0861* (2013.01)

(58) Field of Classification Search
CPC ... G06F 21/32; G06F 21/6263; H04L 63/0861
USPC ............................................................ 726/7
See application file for complete search history.

(56) References Cited

U.S. PATENT DOCUMENTS

2015/0310444 A1* 10/2015 Chen .................. G06Q 20/4016
                                                                    705/44

* cited by examiner

*Primary Examiner* — Kambiz Zand
*Assistant Examiner* — Aubrey H Wyszynski
(74) *Attorney, Agent, or Firm* — Ladas & Parry, LLP

(57) ABSTRACT

An efficient, secured and robust system and method for information security and privacy protection of smart devices, by silent biometric authentication mechanism, is disclosed. The system includes a sensing module associated with biometric sensors, a client module associated with processing engine and an authentication module for silently identifying unauthorized users and managing device security without compromising users' device-experience. The system is also configured with a security action module for tackling an intruder, detecting the source of attack and notifying the authorized user of such an attack.

10 Claims, 6 Drawing Sheets

METHOD AND SYSTEM OF SILENT BIOMETRIC SECURITY PRIVACY PROTECTION FOR SMART DEVICES

CROSS-REFERENCE TO RELATED APPLICATIONS

This application claims the benefit of and priority to Indian Patent Application No. 4169/MUM/2014 filed on Dec. 26, 2014, the disclosure of which is hereby incorporated herein by reference.

TECHNICAL FIELD

The present disclosure generally relates to privacy protection and information security systems, and is more particularly directed to system and method for providing automatic and silent security of smart devices from unauthorized access, based on biometric information or inputs.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With rapidly growing technology, it has become possible to use a single device, popularly known as a smart device, which allows a user to perform a variety of functions like communication, data transfer and management, banking operations and transactions, to name a few. Such smart devices like smart phones, computer systems, laptops etc., are required to support multiple application programs to perform the desired variety of functions and contain several confidential and private information of the user. Owing to their versatile nature, there has been a tremendous growth in the usage of smart devices in recent years, however, along with that a need has arisen to provide for a greater depth of security and privacy protection of the arsenal of sensitive information stored therein.

The current security measures to safeguard such sensitive data has not been sufficient in preventing unauthorized attackers. For rendering security enhancements and assessing, if the user of a device is legitimate/authorized, the existing authentication and access control systems depend upon user's secrets such as passwords and/or physical tokens. The tokens that are used today are easily lost or stolen in the world of hacking, malwares, bugs and many other vulnerable attacks. The passwords in turn are cumbersome to maintain and so in many instances actions are taken which compromise their security, like using a common password for multiple applications, writing down passwords in planners or notebooks, using non-secure character strings such as names or birth dates. The tokens and passwords do not represent true end-to-end authentication as compared to human-to-machine.

True authentication requires a physiological biometric template of the user. Biometrics uniquely identifies a user with extremely sensitive and personal piece of information and provides a secure managed (protected) computing environment for authentication. Considering that various biometric identification of a user like retinal or iris scans, facial features, voiceprints, fingerprints, hand geometry, are specific to every individual, it can be effectively used to protect and secure sensitive information on any device and therefore, it provides an ambit of comfort with the users to use the biometric identifications to securely access their smart devices system. However, currently used biometric authentication procedures in smart devices suffer from several shortcomings. The process of identifying whether the user is authorized or not, requires the user to explicitly call for an authentication or request auto-setting to run before using the device. This requires an active role of the user in the authentication process, which puts a dent on seamless user experience. Further, the biometric system provides security at a higher i.e. phone level but it does not protect individual applications carrying sensitive data. In cases, where security measures have been attempted for application level protection, there is no way to protect the information from an attack, after an initial authentication of the application by the authorized user. Another significant drawback of the existing security systems is that it does not discover the source of attack or identify the attacker.

Hence, in light of the aforementioned, but not limited thereto, it can be concluded that the existing authentication solutions are not sufficient to provide continuous monitoring of the use of smart devices once logged into through biometric authentication process. There is clearly a long felt need to overcome said shortcomings associated with the existing art and this need has been met with by the present disclosure.

The information disclosed in this section is only for enhancement of understanding of the general background of the disclosure. The approaches described herein are approaches that could be pursued, but not necessarily approaches that have been previously conceived or pursued. Therefore, unless otherwise indicated, it should not be assumed that any of the approaches described in this section, qualify as prior art merely by virtue of their inclusion in this section nor should they be taken as an acknowledgement or any form of suggestion that this information is already known to a person skilled in the art.

SUMMARY OF THE DISCLOSURE

The present disclosure provides for an efficient, more secured and robust biometric authentication mechanism for information security, privacy protection and mobile device management.

The disclosure as described herein specifically relates to a system and method for providing device security by biometric authentication. The disclosure encompasses continuously sensing at least one biometric input of a user of a device, by a sensing module. The said biometric input is pre-processed by a client module to generate a request which in turn is used by a processing engine to generate a threat value based on at least one condition. The said threat value is used by the client module to trigger a command for implicitly authenticating the user, by an authentication module specifically adapted for the purpose, based on biometric input of the user and a biometric information template, existing in the system. Based on the results of authentication, a security action is then implicitly implemented, to ensure optimum device security.

BRIEF DESCRIPTION OF DRAWINGS

The accompanying drawings, which are incorporated herein, and constitute a part of this disclosure, illustrate exemplary embodiments of the disclosure in which like reference numerals refer to the same parts throughout the different drawings. The components in the drawings are not necessarily to scale, emphasis instead being placed upon clearly illustrating the principles of the present disclosure. Some drawings may indicate the components using block diagrams and may not represent the internal circuitry of each component.

Figure 1A:
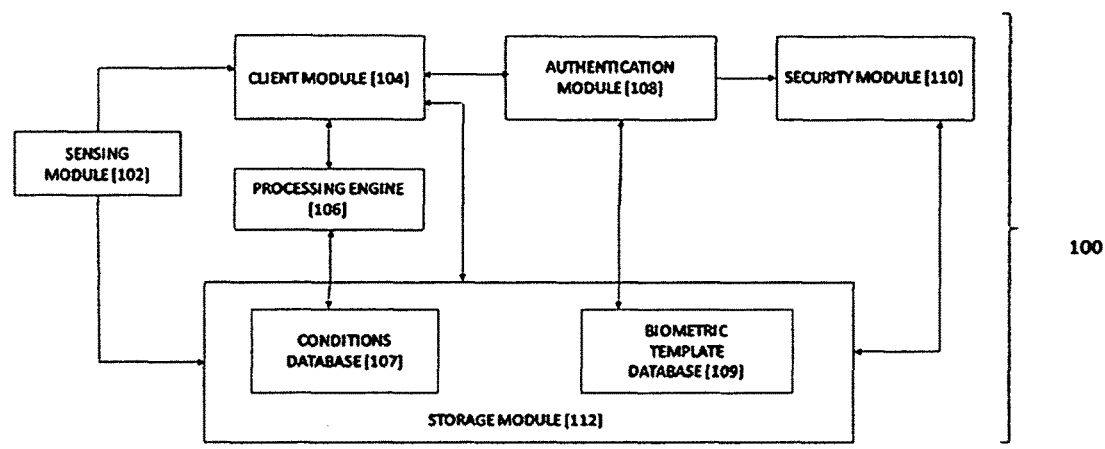
FIG. 1(a) illustrates a general architecture of the security system for biometric authentication as encompassed by the present disclosure.

The foregoing will be apparent from the following more detailed description of example embodiments of the disclosure, as illustrated in the accompanying drawings.

DETAILED DESCRIPTION OF EXEMPLARY EMBODIMENTS

In the following description, for the purposes of explanation, various specific details are set forth in order to provide a thorough understanding of the present disclosure. It will be apparent, however, that the present disclosure may be practiced without these specific details. Several features described hereafter can each be used independently of one another or with any combination of other features. However, any individual feature may not address any of the problems discussed above or might address only some of the problems discussed above. Some of the problems discussed above might not be fully addressed by any of the features described herein. Although headings are provided, information related to a particular heading, but not found in the section having that heading, may also be found elsewhere in the specification. Further, information provided under a particular heading may not necessarily be a part of only the section having that heading. Example embodiments of the present disclosure are described below, as illustrated in various drawings in which like reference numerals refer to the same parts throughout the different drawings.

As used herein, "device/smart device" refers to any electrical, electronic, electromechanical and computing device or equipment. Interface devices may include, but not limited to, a mobile phone, smart phone, pager, laptop, a general purpose computer, desktop, personal digital assistant, tablet computer, mainframe computer, or any other computing device as may be obvious to a person skilled in the art. In general, a device is a digital, user configured, computer networked device that can operate autonomously, capable of storing data and other private/sensitive information. Said device operate at all the seven levels of ISO reference model but the primarily function is related to the application layer along with the network, session and presentation layer.

As used herein, a "network"/"communication network" refers to any medium that connects one or more elements/modules/devices/units/server between the clients/users and server encompassed by the present disclosure. A network includes, but not limit to, personal area network, local area network, metropolitan area network, wide area network, Internet, or any combination thereof. A network may even be a storage area network, virtual private network, enterprise private network or a combination thereof.

As used herein, "current user" refers to the user accessing the device or in possession of/having access to the sensitive information in said device at a present instance. The current user may or may not be authorized to do so and is followed by the security protocol as encompassed by the disclosure. The terms authorized, authentic and legitimate user has been used interchangeably throughout the specification.

As used herein, an "application" refers to any application software that is pre-installed, or downloaded and installed, in an electronic device. Applications include, but not limit to contact management application, calendar application, messaging applications, image and/or video modification and viewing applications, gaming applications, navigational applications, office applications, business applications, educational applications, health and fitness applications, medical applications, financial applications, social networking applications, and any other applications.

As used herein, "biometric information/input" refers to physical, physiological and/or behavioral characteristics of a user, which are unique to each one and therefore serve as model references to authenticate or identify a legitimate user from an attacker. Some of the exemplary physiological biometric physiological characteristics are related to the shape of the body whose examples include, but are not limited to fingerprint, bone structure, palm veins, face recognition, DNA, palm print, hand geometry, iris recognition, retina and odour/scent. Behavioral biometric information is related to the pattern of behavior of a person, including but not limited to typing rhythm, speed, gait, temperature, and voice.

As used herein, "silent/implicit" actions like authentication and/or security measures refer to said action being carried out without interfering with the user activity on the device and running "silently" in the background. It also refers to actions for which no specific user instructions may be required and which run in the background of the device in response to various events.

As used herein, "sensing" biometric information/input refers to receiving by way of sensors one or a number of biometric information/input such as front-view camera for detecting bone structure, iris/retina recognition, sensors for temperature, fingerprint pattern detection etc.

As used herein, "sensitive data" refers to any data or software stored or contained in a computing device. Sensitive data may include but not limit to text messages, text files, emails, photos, audio content, video content or any other personal content or information of the user stored or configured in the computing device.

As used herein, a "request" or "trigger" or "trigger command" is a wireless signal/function or command that is generated in the event of vulnerability of a device being used by an unauthorized user, wherein the vulnerability may be of different magnitude.

As used herein, "send", "transfer", "transmit", and their cognate terms like "sending", "sent", "transferring", "transmitting", "transferred", "transmitted", etc. include sending or transporting content from one unit to another unit, wherein the content may or may not be modified before or after sending, transferring, transmitting.

System Overview

A system and method for providing device security by biometric authentication of the user, in accordance with the present disclosure, is described herein below. While this disclosure has been particularly shown and described with references to example embodiments thereof, it will be understood by those skilled in the art that various changes in form and details may be made therein without departing from the scope of the disclosure.

FIG. 1(a) illustrates an architecture of the security system for biometric authentication as encompassed by the present disclosure, in a preferred embodiment. The system 100 comprises of a sensing module 102 associated with sensors for detection of biometric input; a client module 104 associated therewith; a processing engine 106 further comprising a 'conditions database' 107 in the storage module 112 of the system 100 responsible for assessing a threat value based on conditions stored therein; an authentication module 108 for implicitly/silently identifying if the user is authorized based on the biometric information template stored in the database 109 of the storage module 112; and a security module 110 for implicitly/silently initiating appropriate security measures. The system 100 may be adapted to operate completely or partially on a device or a server.

The sensing module 102 of the system 100 is adapted to continuously sense at least one biometric input of a user of the device with the help of at least one biometric sensor associated with the device. The input may include but not limit to an image or any biometric information of a person by which presence of a security threat or unauthorized access may be determined. The sensed input is stored within a memory that either resides at a central server level or is present internally in the system itself. In a preferred embodiment, the sensed input is stored in a storage module 112. The disclosure encompasses that the sensing module 102 continuously captures biometric inputs from the user without requiring express command for the same. The phrase 'continuously' as used herein refers to uninterrupted in time and without cessation and without requiring any specific command or trigger, to ensure that any change in user is captured without delay, thereby ensuring continuous privacy protection. The disclosure encompasses that the sensing may occur periodically and continuously, where the period limit of sensing may be fixed by either the system 100 or the user at the time of configuration or is dynamically updated at any time in future.

The sensing module 102 is further associated with a client module 104 which receives the biometric input sensed by the sensing module 102 and pre-processes said input to generate a request. It comprises a pre-processor 204 which selects the inputs which reveal the vulnerability of the device to an attack. Depending upon whether a risk/vulnerability of the risk of an attack exists a request/trigger manager 202 of the client module 104 generates a request to initiate identification and authentication procedures. The client module 104 is associated with the storage module 112 wherein all information/input and request generated are stored.

The client module 104 is also coupled to a processing engine 106 which is a decision making module that consists of various conditions and strategies to make decisions, based on said conditions, for a variety of situations. The interaction between the client module 104 and the processing engine 106 is encompassed in FIG. 2 of the disclosure. Said processing engine 106 comprises typically of two sets of conditions namely predefined conditions 302 and dynamic conditions 304, as illustrated by FIG. 3 of the disclosure. The predefined conditions 302 are defined by the user according to his requirements, for example, any application that carries sensitive data may be added to the list of secured applications so that every time the user accesses said listed application, processing is initiated by said engine 106 and if a trigger is generated, silent/implicit biometric authentication ensues. Similarly, the dynamic conditions 304 are learning algorithms to create conditions based on user's behaviour, historical data etc. that is dynamic in nature and may repeatedly change over time. The conditions used by the processing engine 106 may be pre-configured or updated in the system 100.

In an embodiment of present disclosure, more than one condition is applied to the sensed biometric input. These rules may be applied either from the set of pre-defined conditions, dynamic conditions or a combination thereof. In an illustrative scenario, the pre-defined condition may be based on static biometric parameters like bone structure, iris scan etc. while the dynamic conditions may be based on parameters which may depend upon the age and well-being of the user like typing speed/rhythm, voice etc. The disclosure encompasses instances wherein both conditions may be called and applied individually or together/in parallel by the processing engine 106.

Periodical or dynamic updating of the conditions is also encompassed by the present disclosure. The conditions are sensitive and vary for different situations. For instance, an altered body temperature and typing rhythm/speed of a user accessing a device may not confirm the presence of threat, as the same may be possible due to illness or age since in such a case, a specific dynamic condition set may be updated and applied, in response to which generation of trigger command is avoided and no authentication process is initiated.

Additionally and optionally, the conditions present in processing engine 106 may be weighted i.e. each condition is assigned a specific weight according to its nature, type of biometric input detected, the level of authority given to a user etc. Conditions having more weightage will carry more importance in choosing the conditions to be applied. For instance, consider a situation where the user is accessing an unprotected application but not retrieving the sensitive information, where, according to the request, two conditions have to be applied such that the decided conditions are contradictory to each other, for example, one condition says to continue the access to the application until the folder of sensitive information is touched whereas, on the contrary, other condition says to shut down the device. In such instances, the processing engine will check the weightage of the conditions and consequently, condition having more weightage will be considered and a trigger command is generated accordingly.

The present disclosure encompasses that the processing engine 106 calculates a threshold value depending upon different situations. For example, different threshold values may be calculated for different types of biometric information. Thus, processing engine 106 may be considered as self-learning module. This provides intelligent sensing of the biometric information of the current user and recommends the user whether or not there exists a threat in allowing the user to continue. The disclosure encompasses calculation of threshold value by conventional methods known to person skilled in the art. Where the threat value of the current user is more than the threshold value of the authorized user, a trigger command for initiating authentication is generated.

Figure 2:
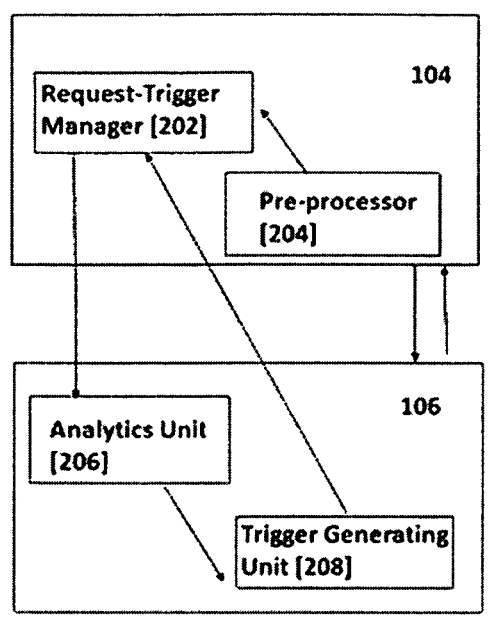
FIG. 2 illustrates a block diagram of the interaction between the components of the client module and the processing engine, in accordance with an example embodiment of the present disclosure.
Figure 3:
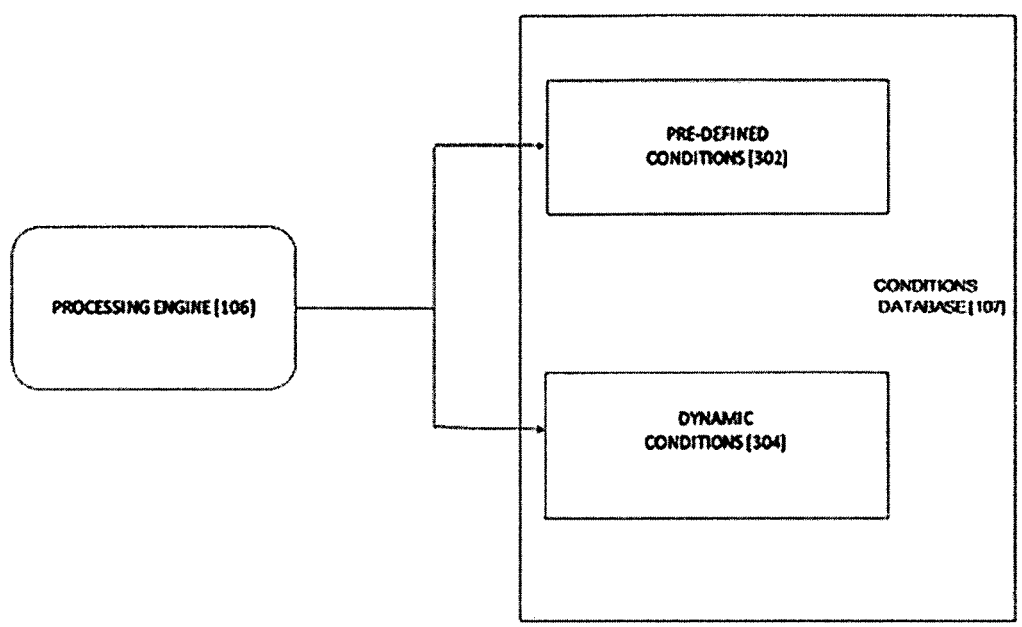
FIG. 3 illustrates a block diagram of the processing engine, in accordance with an example embodiment of the present disclosure.

In an embodiment of the disclosure, as illustrated in FIG. 2 of the disclosure, the processing engine further comprises of an analytics unit 206 which is adapted to analyze the request generated by the client module 104 against all the conditions present therein and then selecting appropriate conditions to be applied on the biometric input that initiated said request. Said analytics unit 206, is further connected to a trigger generating unit 208. The trigger generating unit 208 generates a trigger according to said selected conditions where said trigger typically conveys presence of a threat or breach situation and demands authentication of the biometric input. Said trigger is shared with the request-trigger manager of the client module via the trigger unit of the engine. The request-trigger manager 202 is adapted to trigger an action for authentication based on the trigger generated by the processing engine 106 i.e. based on the identification of the threat/breach or any undesired surroundings.

In an example, say the threshold value for typing speed of the authorized user is 180-200 characters per minute and palm temperature of 45-48 C. So, when normally the authentic user accesses the device/application, the typing speed and temperature fall within the threshold, generating a lower threat value and consequently no trigger for authentication is generated. However, when the authorized user is unwell or the user is an unauthorized individual, a higher threat value will cause the trigger to be generated so as to initiate an authentication procedure.

The client module 104 is further associated with an authentication module 108 to silently authenticate the user based on the biometric input and a biometric information template, without interrupting the usage of the device and a seamless user experience. The authentication unit 108 receives instructions from the client module 104 on generation of trigger and is configured to authenticate the user and identify an attacker based on the pre-stored and updatable biometric information template of authentic users. Accordingly, the authentication module 108 interacts with the biometric template for authentication and is responsible for exchanging information upon receiving the trigger command for authentication based on the threat value. The authentication module 108 is further configured to initiate a security action based on the result of authentication.

The system 100 further comprises a security module 110 which in a preferred embodiment is associated with the authentication module 108 from where the instruction to initiate a security action implicitly or to continue usage, is received, based on the outcome of the authentication process. In an alternative embodiment, the authentication outcome is sent to the client module 104, which in turn sends instructions to the security module 110 depending upon the outcome. The security module 110 is configured to take measures like locking the device, closing the application with sensitive information, sending a notification to the authentic user of the breach of privacy/security, clicking picture of intruder through front camera etc. The present disclosure also encompasses a feature of the security module 110 to recommend user whether it is safe to access the sensitive information or not. Such a determination is made using historical data of the user/system 100. The security module 110 is further configured to identify the attacker by interacting with biometric sensors like front camera and capturing say a photograph of the unauthorized user.

The system 100 also comprises a storage module 112 which is a means for storing and/or loading data, information and instructions. The disclosure encompasses a storage module 112, wherein the storage module includes a volatile memory or a non-volatile memory. The disclosure further encompasses that said module 112 includes a storage device such as magnetic disk, optical disk, etc., or any other medium for storing information and instructions. The disclosure further encompasses that said module 112 is single or multiple, coupled or independent, is positioned at device level or server level and encompasses other variations and options of implementation as may be obvious to a person skilled in the art.

In a preferred embodiment, the storage module 112 of the system 100 is configured with the 'conditions database' 107, as illustrated in FIG. 3 of the specification, which stores the pre-defined 302 as well as dynamic conditions 304 relied upon by the processing engine 106 therein. The storage module 108 is further configured with a biometric template database 109 which stores biometric details of all the authorized users. The biometric information template comprises at least one biometric information of at least one intended user of the device. The databases are capable to being updated as and when new information/input are fed. The storage module 108 further stored the information from all the other modules and is preferably associated with the sensing module 102, client module 104, processing engine 106, authentication module 108 as well as security module 110.

Figure 1B:
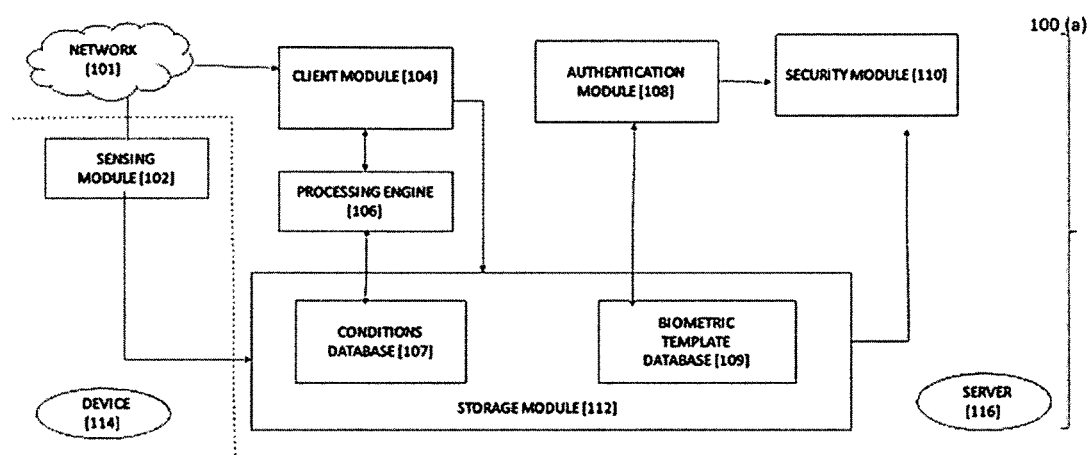
FIG. 1(b) illustrates the architecture of the security system for biometric authentication at server level, in accordance with an example embodiment of the present disclosure.

The system 100 as encompassed by the disclosure is capable of operating at the device level as well as at the server level. In an alternative embodiment, as illustrated in FIG. 1(b), the disclosure encompasses a system 100(a) wherein the sensing module 102 is operating at the device 114 level, while the other modules viz. the client module, the processing engine, the authentication module as well as the associated databases in the storage module are present at the server 116 level, connected by way of a network 101.

The present disclosure encompasses that the system 100 provides a user with an option of selecting the applications or functionalities or features of his device on which the privacy mechanism will be applied, for example the privacy mechanism of the present disclosure may be differentially activated for emails, Facebook and messaging applications and may be deactivated for news applications, images, recordings, etc.

An example illustrating an implicit and differential protection for device/system which may be used in an office/corporate environment by multiple persons is provided herein. The degree of accessibility of sensitive information may be dependent on the hierarchy or post of the officials. For instance, when one official, authorized to access all applications on a device is sharing the device with another official authorized to access emails but unauthorized to access banking application, the system will silently control the access of the banking applications in response to the biometric information of the unauthorized office, where the control will be implemented in the background without compromising with device performance or user experience. This is made possible due to continuous sensing of biometric information of all the current users of the device.

A related embodiment illustrates the implicit and differential protection for applications on a server which may be accessed in an office/corporate environment by multiple persons. The degree of accessibility of sensitive information may be dependent on the hierarchy or post of the officials. For instance, when one official, authorized to access an email applications on the server, while another official unauthorized to access emails is also working on the server. In such a scenario, the access to email application will differentially be provided between the authorized and unauthorized users working on the same server. Said differential authorization does not affect the working of the authorized user who can continue to work on the e-mail application due to successful authentication, the unauthorized official fails the authentication process and the email application is shut, as a security measure. The disclosure ensures that both the authentication and security measures are silent and the performance of the device for an authorized user is seamless and without any hicks thereby making it capable of differential protection of sensitive information.

The present disclosure also encompasses that the system 100 is capable of providing recommendations to the user relating to the data protection i.e. the system can suggest which data/application stored in the computing device requires more security and which data/application requires less security. However, it is totally dependent on the user to select which data/application among the stored data/applications in the device needs to be protected.

The present disclosure also encompasses that the system 100 is capable of being configured in devices including, but is not limited to, a personal device like a mobile phone, computer etc. or a device used commonly in an enterprise/company/association with several legitimate users with different degrees of authorization.

Method Overview

Figure 4:
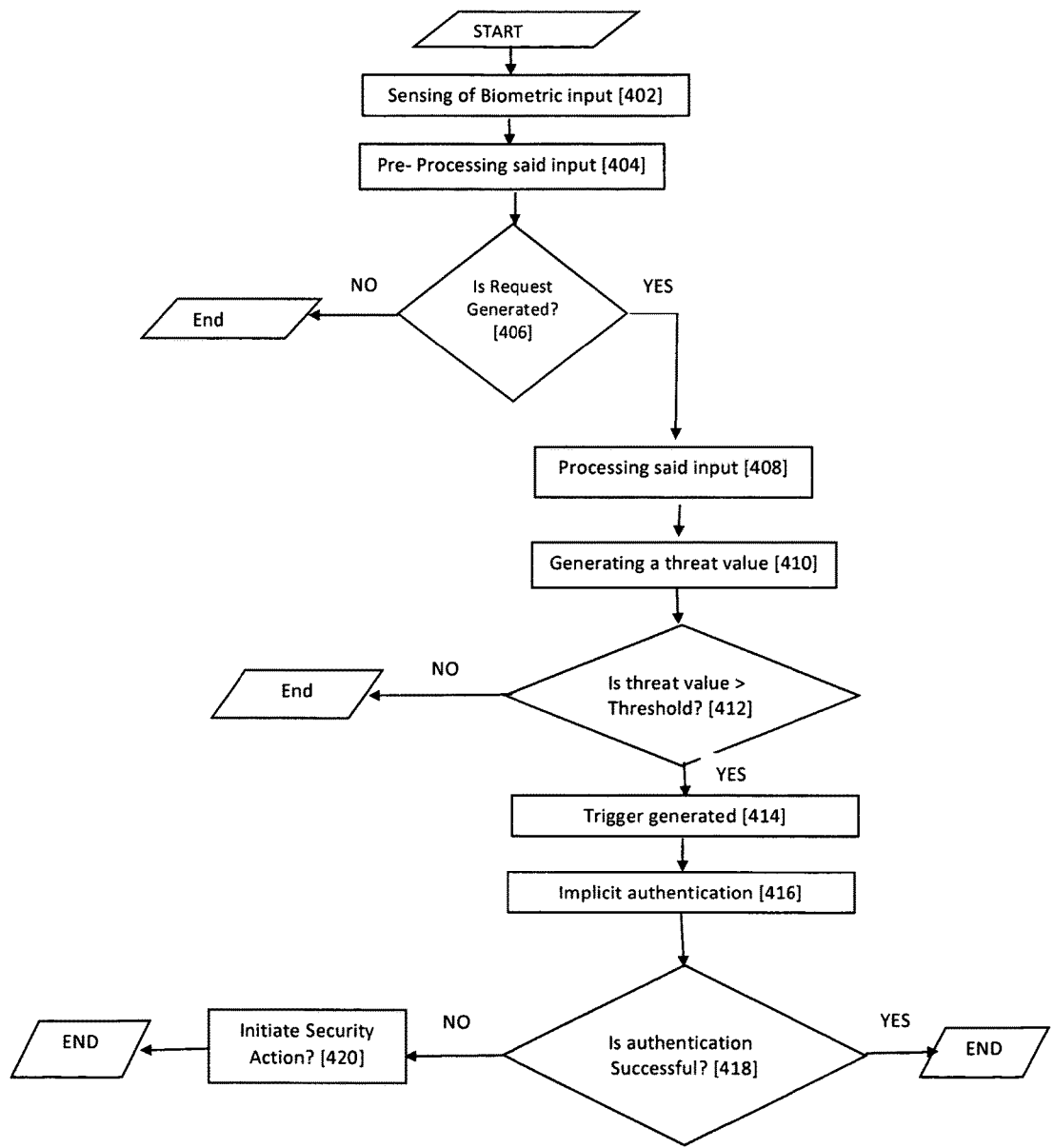
FIG. 4 illustrates a block diagram of the method of biometric authentication for device security, as encompassed by the present disclosure.

FIG. 4 describes the method of biometric authentication for device security, as encompassed by the present disclosure, with the flow of action performed in the whole process.

Step 402 includes continuously sensing of the biometric input/information of the user who is currently accessing/using or begins to access/use a device/smart device by the sensing module, without said user having to give any specific command to do the same i.e. sensing is continuous as well as implicit. The sensing ensures that at any time even after initial log in, if the device falls in the hands of an intruder/unauthorized user, the biometric information will continue to be sensed whether or not said data/application has been opted for privacy protection.

Step 404 includes processing of said biometric input by the pre-processor of the client module. Biometric input of the current user is captured from different sensors and detecting means like camera, microphones, etc. is then sensed by the sensing module. Once the sensing module senses the biometric information it sends the same to the client module, which then pre-processes the received input. Pre-processing of data may include but not limit to converting the data into a standard format that is compatible for use by other units present in the system. Standardized data may be in the form of packets, bits, messages, or any other communication element. Pre-processing may further be characterized with application of initial sorting strategies or rules or conditions, so as to detect a prima facie existence of threat to the device security.

Step 406 encompasses the step of deciding by the client module whether or not there exists a preliminary/prima facie threat to the device security. Where such a threat exists, the request-trigger manager of the client module generates a request. Transfer or transmission or sending of said request includes transfer or transmission of packets, messages, bits, or any other communication element. If the request is not generated the authentication process comes to an end for that biometric input. If the request is generated, then Step 408 encompasses the step of processing said input is initiated.

Step 408 includes processing of the request by the processing engine. The analytics unit of the processing engine analyzes the response received and applies a set of conditions and decisions present in the conditions database of the storage module. This step includes checking, by processing engine, which of the rules stored therein apply to the request received from the request-trigger manager and subsequently preparing a response according to the selected rules. A response, in a preferred embodiment, comprises generation of a threat value by the engine, as covered by step 410, based on the vulnerability of the device to an attack from the current user as per the conditions applied.

In one embodiment of the present disclosure, if the processing engine does not find any rule associated with a particular detected input, then the engine will create and provide a default rule accordingly.

Step 412 includes the step of ascertaining whether the threat value generated therefrom is higher than the threshold value set for the authentic users. In an event where it is not higher, the authentication process for said request is stopped. On the contrary, where the threat value generated is higher than the threshold value, as depicted in step 414 of the figure, a trigger is generated by the trigger generating unit of the engine, thereby initiating authentication of user owing to the plausible threat to device security.

All biometric input sensed, conditions applied and information pre-stored as template, are stored in the storage module, storing said data for future use. Accordingly, the storage module consists of previously sensed input and the currently sensed input. The time limit for storing the data may be defined by system or pre-defined by the user as said system provides the user with a feature to set a time limit for storing said data.

Figure 5:
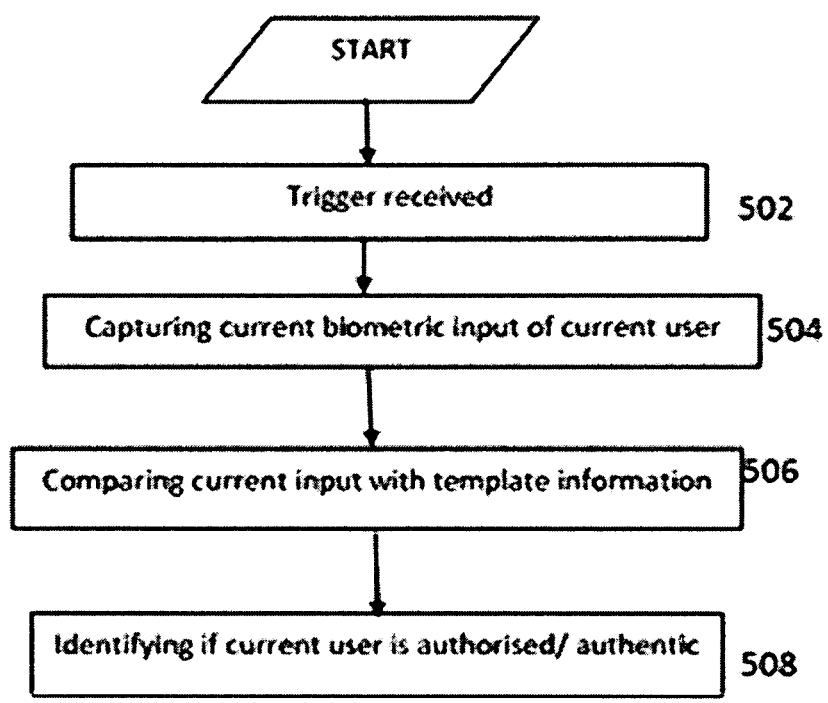
FIG. 5 illustrates a block diagram of the steps for silent biometric authentication, in accordance with an example embodiment of the present disclosure.

Step 416 includes receiving of trigger by the authentication module and implicitly/silently authentication the current user. The preferred authentication procedure has been illustrated in FIG. 5 of the disclosure, wherein once the trigger is received, per step 502, the biometric information of the current user is captured 504 and compared with the biometric information of the authorized user/s stored in the template database 506. The comparison is done to identify if the current users' input coincides with the authentic/authorized users' template 508. Comparison of data may include but not limit to comparing of current input with the immediate previous information present in storage module, or comparing of current input with all the previous information stored in storage module or a combination thereof. The comparison result may include but not limit to "yes" or "no". Absence of similar data leads the method to step 420 of FIG. 1(a), while presence ends the authentication process.

Step 418 includes assessing, as illustrated in FIG. 2, whether the authentication gives a successful result. Where the result is successful and the current user is confirmed as being authentic, the process come to an end and device is deemed secure. However, when authentication is unsuccessful and the current user is unauthorized, then as per step 420, at least one security action is initiated by the security module to deal with the attack appropriately, such that the privacy of the user and sensitive information in the device is not breached. The action may include but is not limited to a notification of an attack and suggestions regarding the safety of device indicating whether and to what extent is the device unsafe from the current user, shutting down of the application having sensitive information, hiding the application/data, self-erasing the data, shutting down of the device, informing an emergency contact, where informing an emergency contact may include but not limit to sending a text message, audio message, video message, e-mailing to an emergency contact where, said emergency contact may be pre-defined either by user or system. The security module also captures the identity of the attacker, by means like clicking a photograph from the front camera of the device, but not limited to the same.

In an embodiment of the disclosure, the user has an option to either accept the notification of the unsuccessful authentication or ignore it. By accepting the notification, user can allow the system to perform any of the aforementioned security actions such as hiding his data, shut down his device directly or simply closing down the application. On the contrary, user can also ignore the notification and continue to access his device.

In another embodiment of the present disclosure, user has feature of shutting down of entire system for a specific type of data/application. Also, system provides increased security for increasing number of threats even if the user has shut down the system for that specific data/application for some specific period of time.

Further, the present system encompasses that the system contains log history of all the notifications. Furthermore, user can also modify the settings of log history to view one or more of the duration, sequence of the notifications, security actions, etc.

Although the present disclosure has been described in considerable detail with reference to certain preferred embodiments and examples thereof, other embodiments and equivalents are possible. Even though numerous characteristics and advantages of the present disclosure have been set forth in the foregoing description, together with functional and procedural details, the disclosure is illustrative only, and changes may be made in detail. Thus various modifications are possible of the presently disclosed system and process without deviating from the intended scope and spirit of the present disclosure.

We claim:

1. A method for providing device security by biometric authentication, comprising:
   continuously sensing at least one biometric input of a user of a device, by a sensing module;
   receiving and preprocessing said biometric input of the user to generate a request by a client module;
   receiving and processing said request by a processing engine to generate a threat value based on at least one condition;
   generating a trigger command based on said threat value by the client module; and
   running implicit actions in background of the device in operation, wherein the implicit actions are carried out without interfering with user activity on the device, and wherein the implicit actions include:
   implicitly authenticating the user in response to said trigger command by an authentication module, wherein said authentication is based on the biometric input and a biometric information template; and
   implicitly implementing a security action based on said authentication.

2. The method as claimed in claim 1, wherein said at least one condition comprises one of a pre-defined condition, a dynamic condition and a combination thereof.

3. The method as claimed in claim 1, wherein generating said trigger command comprises comparing said threat value with a predefined threshold value.

4. The method as claimed in claim 1, wherein implicitly implementing a security action further comprises identifying the user in an event of unsuccessful authentication.

5. The method as claimed in claim 4, wherein identifying the user comprises capturing current biometric input of said user.

6. The method as claimed in claim 1 may be adapted to operate completely or in parts at a device level, a server level or a combination thereof.

7. The method of claim 1 may be adapted to continuously run as a background process on the device.

8. A system for providing device security by biometric authentication comprises:
   a sensing module for continuously sensing at least one biometric input of a user of a device;
   a client module associated with the sensing module, for receiving and pre-processing said biometric input to generate a request;
   a processing engine, associated with the client module, comprising at least one condition, for processing said request to generate a threat value based on said at least one condition, the processing engine running implicit actions in background of the device in operation, wherein the implicit actions are carried out without interfering with user activity on the device;
   an authentication module associated with the processing engine to perform the implicit actions of implicitly authenticating the user based on the biometric input and a biometric information template; and
   a security module for performing the implicit actions of implicitly implementing a security action based on said authentication.

9. The system as claimed in claim 8, wherein the biometric information template comprises at least one biometric information of at least one intended user of the device.

10. The system as claimed in claim 9, wherein the at least one biometric input of the authentic user comprises one of a pre-defined information, a dynamic information and a combination thereof.

* * * * *